United States Patent [19]

Bonne et al.

[11] 4,032,093

[45] June 28, 1977

[54] ADAPTIVE ENERGY MANAGEMENT FOR VERTICAL SPEED CONTROL OF AN AIRCRAFT

[75] Inventors: Jimmie Harold Bonne; Robert D. Simpson, both of Bellevue, Wash.

[73] Assignee: The Boeing Company, Seattle, Wash.

[22] Filed: June 27, 1975

[21] Appl. No.: 591,253

[52] U.S. Cl. .................................. 244/180; 244/178; 244/187
[51] Int. Cl.² .................................................. G05D 1/08
[58] Field of Search ............... 73/178 R; 235/150.2, 235/150.22; 244/77 A, 77 D, 77 F, 177, 178, 180–182, 186, 187; 318/583, 584; 340/27 R, 27 AT, 27 GS

[56] References Cited

UNITED STATES PATENTS

| 3,333,795 | 8/1967 | Hattendorf et al. | 244/77 A |
| 3,578,268 | 5/1971 | Kramer | 244/77 D |
| 3,578,269 | 5/1971 | Kramer et al. | 244/77 A |
| 3,618,878 | 11/1971 | Klein | 244/181 X |
| 3,801,049 | 4/1974 | Simpson et al. | 244/77 A |

Primary Examiner—Stephen G. Kunin
Attorney, Agent, or Firm—Conrad O. Gardner; Glenn Orlob

[57] ABSTRACT

A system for generating an optimum vertical speed command and controlling the aircraft to this command by allowing the aircraft to assume an optimum trimmed condition for the thrust energy available which system utilizes the aircraft autopilot system.

1 Claim, 4 Drawing Figures

ADAPTIVE ENERGY MANAGEMENT FOR VERTICAL SPEED CONTROL OF AN AIRCRAFT

This invention relates to vertical speed control of an aircraft and more particularly to adaptive energy management for vertical speed control of the aircraft.

Present systems for generating the go-around command utilize the concept disclosed in U.S. Pat. No. 3,847,328 issued Nov. 12, 1974, or speed command/angle of attack computers. The concept disclosed in aforementioned U.S. Pat. No. 3,847,328 commands a fixed vertical speed while the speed command/angle of attack concept is complex and involves the use of separate computers and sensors to perform the go-around maneuver.

It is accordingly an object of this invention to provide a system utilizable for vertical speed control including, e.g., go-around control which commands an optimum vertical speed for the available thrust, and is also fail safe (uses circuitry known to be operating during the approach) and further, has the capability of compensating for engine failures or thrust mismanagement.

The foregoing and other objects and advantages of the invention will appear more fully hereinafter from a consideration of the detailed description which follows taken together with the accompanying drawings wherein an embodiment of the invention is illustrated by way of example.

In the drawings:

FIG. 1 is a block diagram illustrative of an automatic approach and go-around mode as shown in the aforementioned U.S. Pat. No. 3,847,328;

Figure 1:
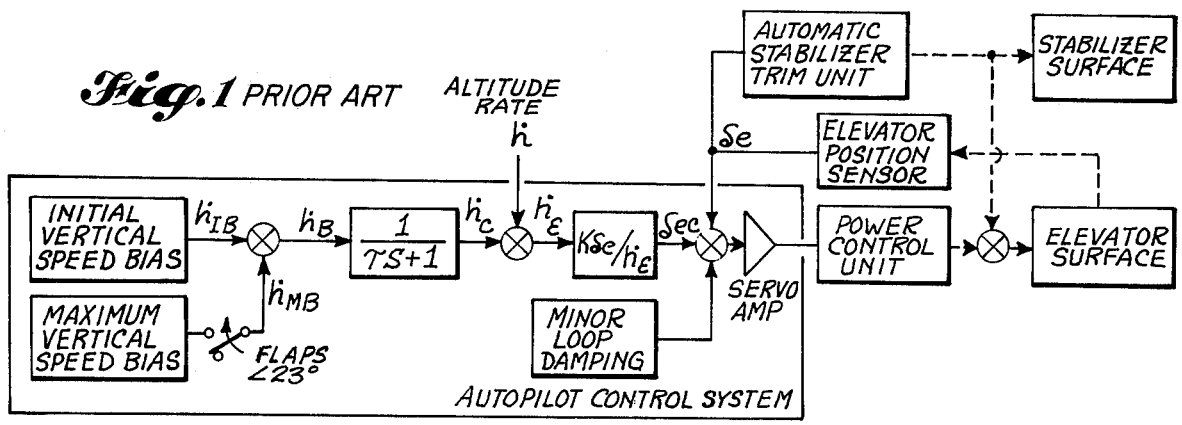

Turning now to FIG. 1 showing the system, a state of the art system will be recognized which is simple and fail safe (utilizes circuitry known to be operating during the approach) but always commands a fixed vertical speed which is not necessarily optimum for the thrust available.

Figure 2:
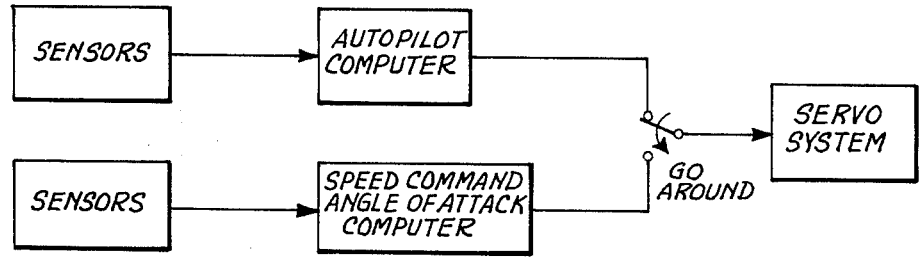
FIG. 2 is a block diagram illustrative of speed command/angle of attack computers for generating a go-around command.

Briefly now turning to FIG. 2, it will be observed that the speed command/angle of attack concept shown therein is complex since it involves the use of separate computers and sensors to perform the go-around maneuver. It should be further noted that such system concept is not fail safe in that it could produce a nose down hardover maneuver at critical altitude (when a go-around is initiated) although it includes the capability of handling engine failures or thrust mismanagement.

Figure 3:
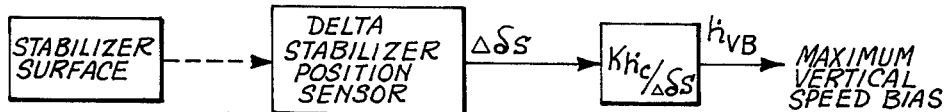
FIG. 3 is a block diagram illustrative of the system concept of the present invention; and, FIG. 4 is a detailed block diagram of the system of FIG. 1 utilizing the concepts shown in FIG. 3.
Figure 4:
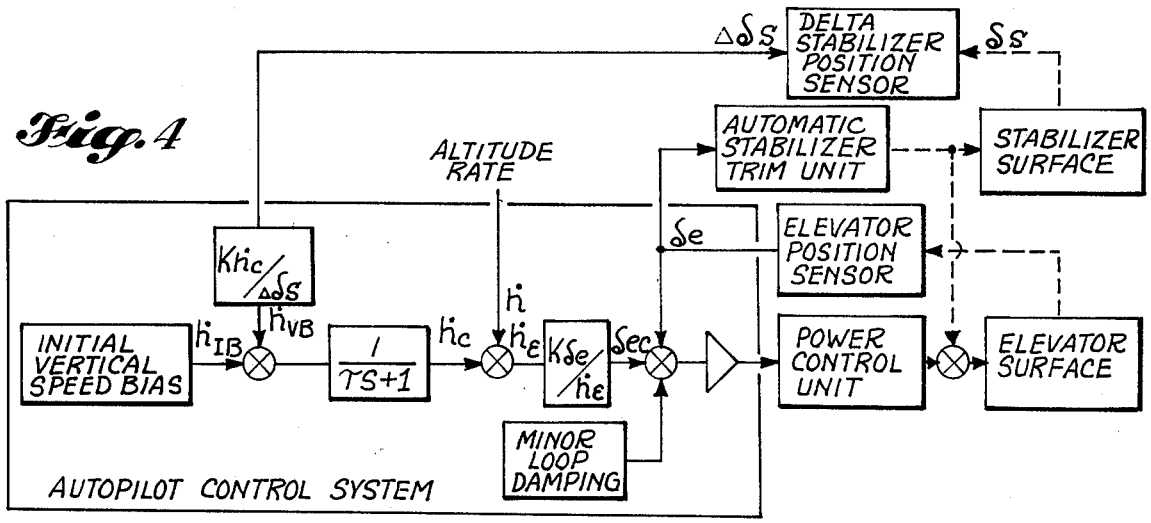

A comparison now of FIGS. 1 and 4 will show that the fixed maximum vertical speed bias and the flaps <23° switch of FIG. 1 have been replaced by a variable vertical speed command proportional to the change in stabilizer position during the go-around of the type shown in FIG. 3.

Turning now to the detailed description of the system embodiment shown in FIG. 4 illustrative of the present adaptive energy management system for generating an optimum vertical speed command for the available thrust energy level and also controlling the aircraft to this command by allowing the aircraft to assume an optimum trimmed condition, it will be noted that the system is particularly useful for but not limited to use in the aircraft go-around condition.

In operation of the system, prior to the go-around, a feedback signal denoting a delta stabilizer position signal $\Delta\delta_s$ is zero and the total vertical speed command $(\dot{h}_c)$ is initially equal to an initial vertical speed bias signal $\dot{h}_{IB}$ and a variable vertical speed command $\dot{h}_{VB}$ passed through a delay circuit. The $\dot{h}_{VB}$ signal is obtained from a unit whose input is $\Delta\delta_s$ and whose operand is $$\frac{K_{\dot{h}c}}{\Delta\delta_s}$$

The autopilot system further compares $\dot{h}_c$ with an altitude rate signal $\dot{h}$ to derive an $\dot{h}_e$ signal which is fed into a network having a transfer function $K\delta_e/\dot{h}_e$ to produce an elevator command signal $\delta_{ec}$. The latter together with a damping signal and an elevator feedback signal are compared to produce an elevator control signal. At the start of a go-around the aircraft assumes the initial vertial speed $\dot{h}_{IB}$ with a time constant $\tau$ of the delay network. If the available thrust level is greater than that required to maintain $\dot{h}_{IB}$ an increase in speed will occur which results in additional lift and a nose down elevator command generated by the autopilot system so as to retrim the aircraft. The latter elevator command $\delta_e$ is inputted into an automatic stabilizer trim unit which repositions the stabilizer to produce a stabilizer signal $\delta_s$ and thereby returns the elevator to trim neutral. The stabilizer signal is inputted into a Delta Stabilizer Position Sensor to develop the aforementioned delta stabilizer position signal $\Delta\delta_s$. The latter signal is indicative of the excess energy within the system and serves to modulate the vertical speed command signal $\dot{h}_{VB}$ causing the aircraft to increase its rate of climb. On the other hand, if the vertical speed command $\dot{h}_c$ is greater than the available thrust level, the aircraft will lose speed and lift causing the autopilot to provide a nose up elevator signal and the stabilizer will be repositioned in a nose up direction. This results in $\Delta\delta_s$ which reduces the vertical speed command $\dot{h}_c$.

It can be seen from the followng that the principles of operation are simple, yet extremely effective. Referring still to FIG. 4, the following is a summary in brief of system operation:

1. Prior to go-around the $\Delta\delta_s$ position signal is zero and the total vertical speed command $(\dot{h}_c)$ initially is equal to $\dot{h}_{IB}$.
2. At go-around initiation, the airplane will assume the initial vertical speed $\dot{h}_{IB}$ with the time constant $\tau$.
3. If the thrust level available during the go-around maneuver is in excess of that required to maintain $\dot{h}_{IB}$, then the airplaine will begin to increase in speed. This increase in speed generates additional lift and results in the autopilot commanding a steady state nose down elevator $(\delta_e)$ to retrim the airplane.
4. The automatic stabilizer trim unit will reposition the stabilizer $(\delta_s)$ returning the elevator $(\delta_e)$ to trim neutral and producing a delta stabilizer position $(\Delta\delta_s)$ signal.
5. This signal $(\Delta\delta_s)$ is representative of excess energy within the system and is used to modulate the vertical speed command ($\dot{h}_{VB}$) causing the airplane to increase its rate of climb.

6. Conversely, if the vertical speed command is in excess of the climb capability of the airplane due to thrust limitations, then the airplane will begin to lose speed and lift. The autopilot will command a nose up elevator ($\delta_e$) and the stabilizer ($\delta_s$) will be repositioned in a nose up direction.

7. This results in a $\Delta\delta_s$ signal which reduces the vertical speed command ($\dot{h}_c$).

From the preceding system description including mode of operation it can readily be seen that the net effect of the system is to provide a relatively simple means of balancing the energy vectors generated in the aircraft to provide an optimum vertical speed for the available thrust. In essence this is accomplished by allowing the aircraft/autopilot system to be its own angle of attack computer. The system herein above described is especially useful in (1) low cost aircraft where the additional cost of a speed command system would be over-burdensome costwise or (2) for fail-operative systems where reliability and safety are the overriding consideration as well as the necessity for low altitude go-around capability

What is claimed is:

1. In combination in an aircraft flight control system having means for processing signals ($\dot{h}_{VB}$) representative of maximum vertical speed bias, the improvement comprising:

feedback circuit means including delta stabilizer position sensing means responsive to a stabilizer position of an aircraft for providing a delta stabilizer position signal $\Delta\delta_s$, said feedback circuit means further having an operand $K\dot{h}_c/\Delta\delta_s$ for providing said signals ($\dot{h}_{VB}$) representative of maximum vertical speed bias.

* * * * *